US006554183B1

(12) United States Patent
Sticha et al.

(10) Patent No.: US 6,554,183 B1
(45) Date of Patent: Apr. 29, 2003

(54) AUTOMATED SYSTEMS AND METHODS FOR AUTHORIZATION AND SETTLEMENT OF FLEET MAINTENANCE AND REPAIR TRANSACTIONS

(75) Inventors: Mary T. Sticha, Bloomington, MN (US); Susan M. Riesgraf, Eagan, MN (US)

(73) Assignee: GE Capital Fleet Services, Eden Prairie, MN (US)

( * ) Notice: Subject to any disclaimer, the term of this patent is extended or adjusted under 35 U.S.C. 154(b) by 0 days.

(21) Appl. No.: 09/343,838

(22) Filed: Jun. 30, 1999

(51) Int. Cl.$^7$ ............................................... G06F 17/60
(52) U.S. Cl. ........................... 235/379; 705/29; 705/44
(58) Field of Search ................................. 235/379, 380; 705/26, 29, 44; 379/90.01, 91.01

(56) References Cited

U.S. PATENT DOCUMENTS

| | | | |
|---|---|---|---|
| 4,947,027 A | | 8/1990 | Golightly |
| RE34,096 E | | 10/1992 | Golightly |
| 5,181,238 A | * | 1/1993 | Medamana et al. ....... 379/93.03 |
| 5,223,699 A | * | 6/1993 | Flynn et al. ................. 235/380 |
| 5,321,751 A | | 6/1994 | Ray et al. |
| 5,477,040 A | | 12/1995 | Lalonde |
| 5,485,510 A | * | 1/1996 | Colbert ........................ 235/380 |
| 5,745,554 A | * | 4/1998 | Rozetti ........................ 235/380 |
| 5,991,750 A | * | 11/1999 | Watson .......................... 705/44 |
| 6,157,923 A | * | 12/2000 | Ivler et al. ..................... 707/10 |
| 6,327,578 B1 | * | 12/2001 | Linehan ........................ 705/65 |

OTHER PUBLICATIONS

GE Capital Fleet Services Fact Sheet.
GE Capital Fleet Services Manage Fleet Costs And Improve Productivity Brochure.
GE Capital Fleet Services National Account Program Brochure.
GE Capital Fleet Services Accident Repair Sheet.
GE Capital Fleet Services Maintenance Management Sheet.

* cited by examiner

Primary Examiner—Karl D. Frech
Assistant Examiner—Daniel A. Hess
(74) Attorney, Agent, or Firm—Armstrong Teasdale LLP

(57) ABSTRACT

Systems and methods for the authorization and settlement of fleet maintenance and repairs are described. In one embodiment, the system includes an interactive voice recognition system, an acquiring bank system, an issuing bank pre-authorization system, and a fleet services provider pre-authorization system. The interactive voice recognition (IVR) system generally is utilized for handling authorizations and repair data capture for network providers. The acquiring bank system is coupled to the IVR system and, in general, assigns codes to the various requests that may be generated. The issuing bank pre-authorization system is coupled to the interactive voice recognition system and is a database for storing information relating to pre-authorized repair and maintenance services. The issuing bank pre-authorization system also is coupled to a vendor relations system and a merchant class code system. The vendor relations system generally includes both a data and a voice link to the IVR system so that in the event that a particular merchant is not an authorized service provider, a direct link can be established between the merchant and the vendor relations system so that the merchant can be set-up as an authorized provider. The acquiring bank system and pre-authorization system are electronically linked, e.g., via modem, to a credit card system, such as the Master Card system. The credit card system is electronically linked to an issuing bank system, e.g., via modem, so that if the credit card system determines that a charge is valid and authorized, the acquiring bank system actually issues the authorization to a service provider.

22 Claims, 7 Drawing Sheets

AUTOMATED SYSTEMS AND METHODS FOR AUTHORIZATION AND SETTLEMENT OF FLEET MAINTENANCE AND REPAIR TRANSACTIONS

BACKGROUND OF THE INVENTION

This invention relates generally to credit card transactions and more particularly, to systems and methods for authorizing and settling transactions associated with the maintenance and repair of vehicles of a fleet.

Managing the repair and maintenance of vehicles (e.g., cars and trucks) which are part of a fleet presently is a time consuming and tedious task. For example, to authorize a repair and maintenance service provider to perform a particular repair or maintenance service, a purchase order typically is issued by the fleet manager to the provider. If hundreds of vehicles are included within the fleet, such a system may require the issuance of hundreds, and possibly even thousands of purchase orders over a short time period.

In addition, it is desirable to track how often maintenance and repair work is performed on each vehicle. Such tracking enables the fleet manager to determine the desired timing for future services, whether unnecessary services are being provided, and the operating costs for each vehicle. Issuing voluminous purchase orders, and tracking maintenance/repair information for hundreds, or thousands, of vehicles can be extremely time consuming and tedious.

In an attempt to at least control costs and provide administrative relief, some fleet managers have contracted fleet service providers with networks of service providers who will perform repairs and maintenance in accordance with established guidelines. Typically, and to enable at least some control, purchasing instruments, e.g. credit cards, are issued to authorized drivers of fleet vehicles. If a particular vehicle requires maintenance or repair service, the driver is instructed to take the vehicle to a network provider and request that the work be performed. This network provider then calls the fleet service provider for authorization of the work and establishment of a pre-authorization for the repair. In such a situation, the repair and maintenance services are provided by the network provider based upon the approval and promise of payment of the fleet service company.

At least with respect to fleet maintenance and repairs, it is desirable to enable the fleet manager, or its fleet service provider, to control the maintenance and repair authorization process to ensure that the maintenance or repair is necessary and is being provided on a negotiated price basis. In addition, it would be desirable to automate, and simplify, the authorization and settlement process associated with the repair and maintenance of fleet vehicles, thus reducing the costs associated with fleet management.

SUMMARY OF THE INVENTION

These and other objects may be attained by systems and methods for the authorization and settlement of fleet maintenance and repairs which, in one embodiment of the system, includes an interactive voice recognition system, an acquiring bank system, an issuing bank pre-authorization system and a fleet service providers pre-authorization system. The interactive voice recognition (IVR) system generally is utilized for handling authorizations and repair data capture for network providers, e.g. merchants. The acquiring bank system is coupled to the fleet service providers pre-authorization system and, in general, assigns codes to the various requests that may be generated through the fleet service providers pre-authorization system.

The issuing bank pre-authorization system is coupled to the interactive voice recognition system and is a database for storing information relating to pre-authorized repair and maintenance services. The data stored in the issuing bank pre-authorization system sometimes is referred to herein as a pre-authorization table. The issuing bank pre-authorization table is populated by a pre-authorization table of the fleet service provider. The fleet service provider pre-authorization table contains specific repair details for the transaction as part of the overall vehicle repair history, such as transaction date, authorized repair provider, total dollar amount authorized, work authorization (purchase order) number, applicable credit card number, and other data.

The fleet service providers pre-authorization system also is coupled to a vendor relations system. The vendor relations system generally includes both a data and a voice link to the IVR system so that in the event that a particular merchant is not an authorized service provider or under other circumstances as described hereinafter in more detail, a direct link can be established between the merchant and the vendor relations system so that the merchant can be set-up as an authorized provider.

The acquiring bank system and the issuing bank pre-authorization system (sometimes referred to herein as a smart acquirer) are electronically linked, e.g., via modem, to a credit card system, such as the Master Card system. Generally, using the information available from the acquiring bank system and the issuing bank pre-authorization system, the credit card system is provided with sufficient information to determine whether a valid charge can be made against a credit card account. The credit card system is electronically linked to an issuing bank system, e.g., via modem, so that if the issuing bank pre-authorization system determines that a charge is valid and authorized, the issuing bank system actually issues the authorization to a service provider, via the credit card system and acquiring bank system. Of course, if a transaction is not valid or not authorized, then the issuing bank system prevents the transaction from occurring with the provider.

Generally, credit cards are issued to individuals designated by a fleet manager from the issuing bank as designated by the fleet service provider. The fleet manager typically contracts with a fleet service provider who maintains a network of repair providers (i.e., merchants). Each fleet manager sets repair authorization parameters for the fleet service provider to follow. If a repair exceeds authorization parameters, the fleet manager typically is contacted for approval.

With respect to the process executed by the above described authorization and settlement system, merchants (i.e., service providers) are generally classified as account types "A, B, C, D, and E". The steps executed depend, at least in part, on the particular account type. The classification designations are described below in more detail. In any event, processing is initiated by the service provider at the point of purchase of the product or service. If the merchant is not following system procedures and simply swipes the credit card before obtaining pre-authorization from the fleet service provider, the card information is transmitted to and processed by the issuing bank system. No "promo" code will be associated with the transaction in the issuing bank pre-authorization system. The card information is passed to the credit card system by the issuing bank system, and the transaction is then denied.

Prior to performing any repair, the merchant calls (e.g., via the telephone) the IVR system to obtain authorization.

Customer information is supplied via the IVR system, and the merchant and transaction are validated. Based on the dollar amount of the transaction, interaction with the fleet service provider may be necessary to approve the repair. Such validation data is supplied to the issuing bank pre-authorization system, and the acquiring bank system processes the transaction and supplies transaction data to the credit card system. A "promo code" of "1" is assigned to the transaction for processing by the acquiring bank system.

The issuing bank system validates, from the issuing bank pre-authorization system, that the repair/maintenance merchant class code (MCC) transaction is an approved provider. The issuing bank system also checks the "promo" code assigned to the transaction and if the transaction exists in the issuing bank pre-authorization system. If no pre-authorization or "promo" code is assigned to a particular transaction, then the merchant is provided with a "call referral" indication, or other message, at the point of purchase (e.g., on the display of the machine in which the credit card is swiped). In addition to determining if a pre-authorization for the transaction is found in the pre-authorization table, and if a "promo" code is assigned to the transaction, normal credit card authorization functions such as checking for possible fraud or a stolen card can be performed. If all the issuing bank checks are passed, then the transaction is approved. After completion of an authorized repair, the acquiring bank credits the merchant for the repair and credits the fleet service provider, e.g., a negotiated volume rebate).

The above described system and process enable the fleet manager and its fleet service provider to control the maintenance and repair authorization process to ensure that the maintenance or repair is necessary and is being provided on a negotiated price basis. In addition, the system and process provide an automated authorization and settlement process for the repair and maintenance of fleet vehicles which are simple to use and are believed to reduce the costs associated with fleet management.

DETAILED DESCRIPTION

Figure 1:
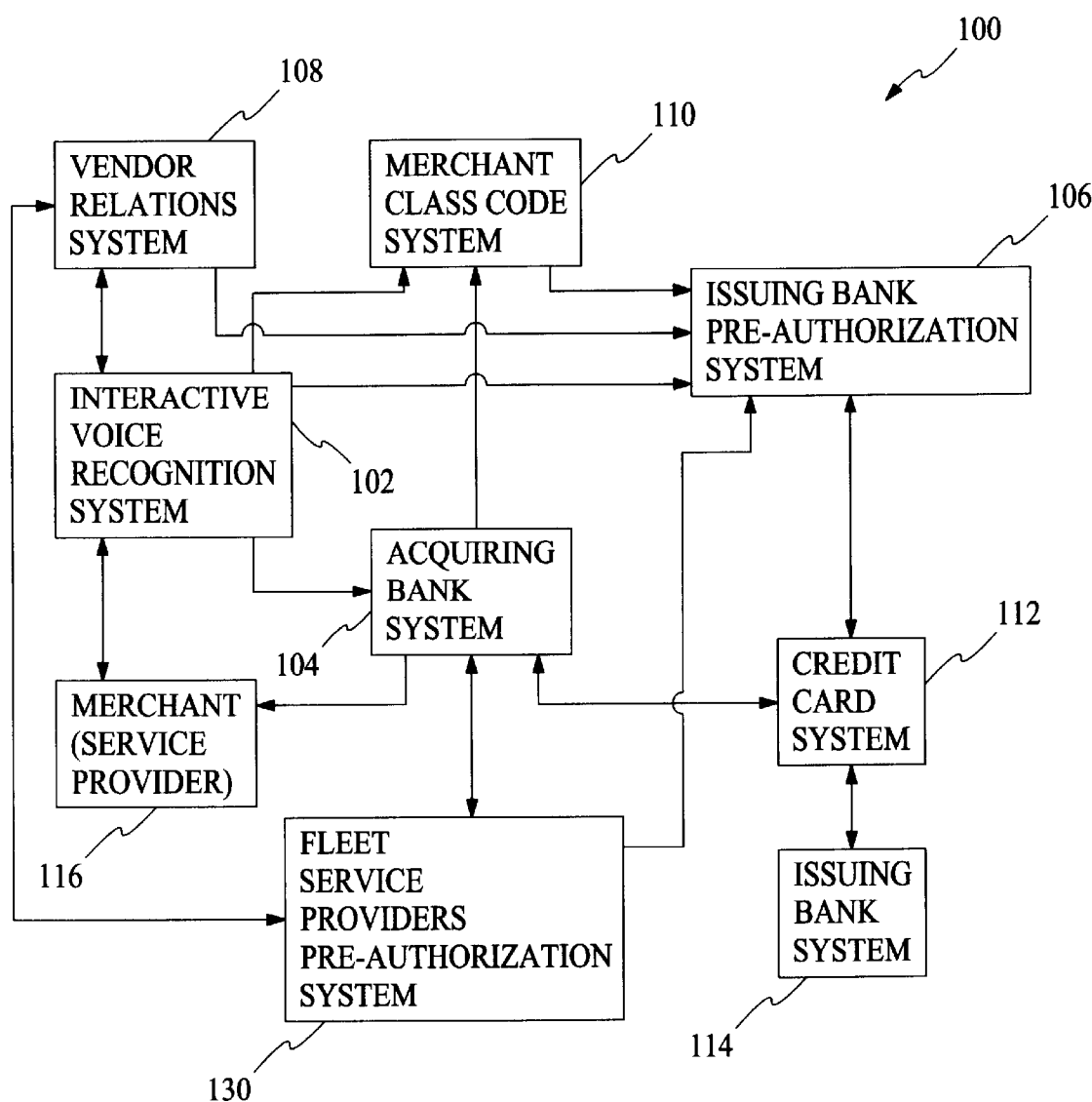
FIG. 1 is a block diagram of components for a fleet maintenance and repair authorization and settlement system in accordance with one embodiment of the present invention.

FIG. 1 is a block diagram of components for an exemplary fleet maintenance and repair authorization and settlement system 100 in accordance with one embodiment of the present invention. System 100 may, of course, have many alternative configurations and system 100 is illustrated and described herein by way of example only. Further, although the computer systems and processors which form elements of system 100 are specifically identified below, it should be understood that in implementing system 100, alternative computer systems and processors can be utilized.

Referring now specifically to FIG. 1, system 100 includes an interactive voice recognition system 102, an acquiring bank system 104, an issuing bank pre-authorization system 106 and a fleet service provider pre-authorization system 130. Interactive voice recognition (IVR) system 102 generally is utilized for handling authorizations and repair data capture for network providers. IVR system 102 may, for example, be constructed utilizing personal computer system commercially available from Hewlett Packard and an IVR interface available from Brite Voice Systems, Inc. of Heathrow, Fla.

Acquiring bank system 104 is coupled to IVR system 102 and, in general, assigns codes to the various requests that may be generated through IVR system 102. Acquiring bank system 104 may, for example, be constructed utilizing a 3090 mainframe computer system commercially available from International Business Machines. As described below in more detail, the codes assigned by acquiring bank system 104 dictate the manner in which each request is handled.

Issuing bank pre-authorization system 106 also is coupled to interactive voice recognition system 102 and is a database for storing information relating to pre-authorized repair and maintenance services. The database is hosted on a computer system, for example, a 3090 mainframe computer, and is commercially available from Oracle Corporation of Redwood Shores, Calif. The database may be utilized to construct pre-authorization system 106. The data stored in system 106 sometimes is referred to herein as a pre-authorization table.

In addition to being coupled to IVR system 102, issuing bank pre-authorization system 106 is coupled to a vendor relations system 108 and a merchant class code system 110. Vendor relations system 108 generally includes both a data and a voice link to IVR system 102 so that in the event that a particular merchant is not an authorized service provider or under other circumstances as described hereinafter in more detail, the merchant can have a direct link to vendor relations system 108 and be set-up as an authorized provider, provided that the merchant satisfies the requirements of the system manager. Vendor relations system 108 may be constructed using a personal computer such as the personal computer system commercially available from Hewlett Packard hosting a database such as the Oracle database.

Merchant class code (MCC) system 110 also may be constructed using a personal computer such as the personal computer system commercially available from Hewlett Packard, and performs the function of assigning universal codes to the various types of work that may be performed in connection with fleet services and repairs. The assigned code is utilized by pre-authorization system 106 in connection with the authorization process as described below.

Acquiring bank system 104 and issuing bank pre-authorization system 106 are electronically linked, e.g., via modem, to a credit card system 112, such as the Master Card system. Generally, using the information available from acquiring bank system 104 and pre-authorization system 106, credit card system 112 is provided with sufficient information to determine whether a valid charge can be made against a credit card account.

Credit card system 112 is electronically linked to an issuing bank system 114, e.g., via modem, so that if credit card system 112 determines that a charge is valid and authorized, issuing bank system 114 actually issues the authorization to a service station 116. Of course, if a transaction is not valid or not authorized, then issuing bank system 114 prevents the transaction from occurring with service station 116.

Again, the specific system architecture illustrated in FIG. 1 is an exemplary architecture and many alternative architectures within the scope of the present invention can be utilized. The system architecture illustrated in FIG. 1 is believed to provide the advantages of having the capability of handling many different types of fleet service maintenance and repair transaction, including authorization and settlement transactions, without being overly complex and costly.

Figure 2:
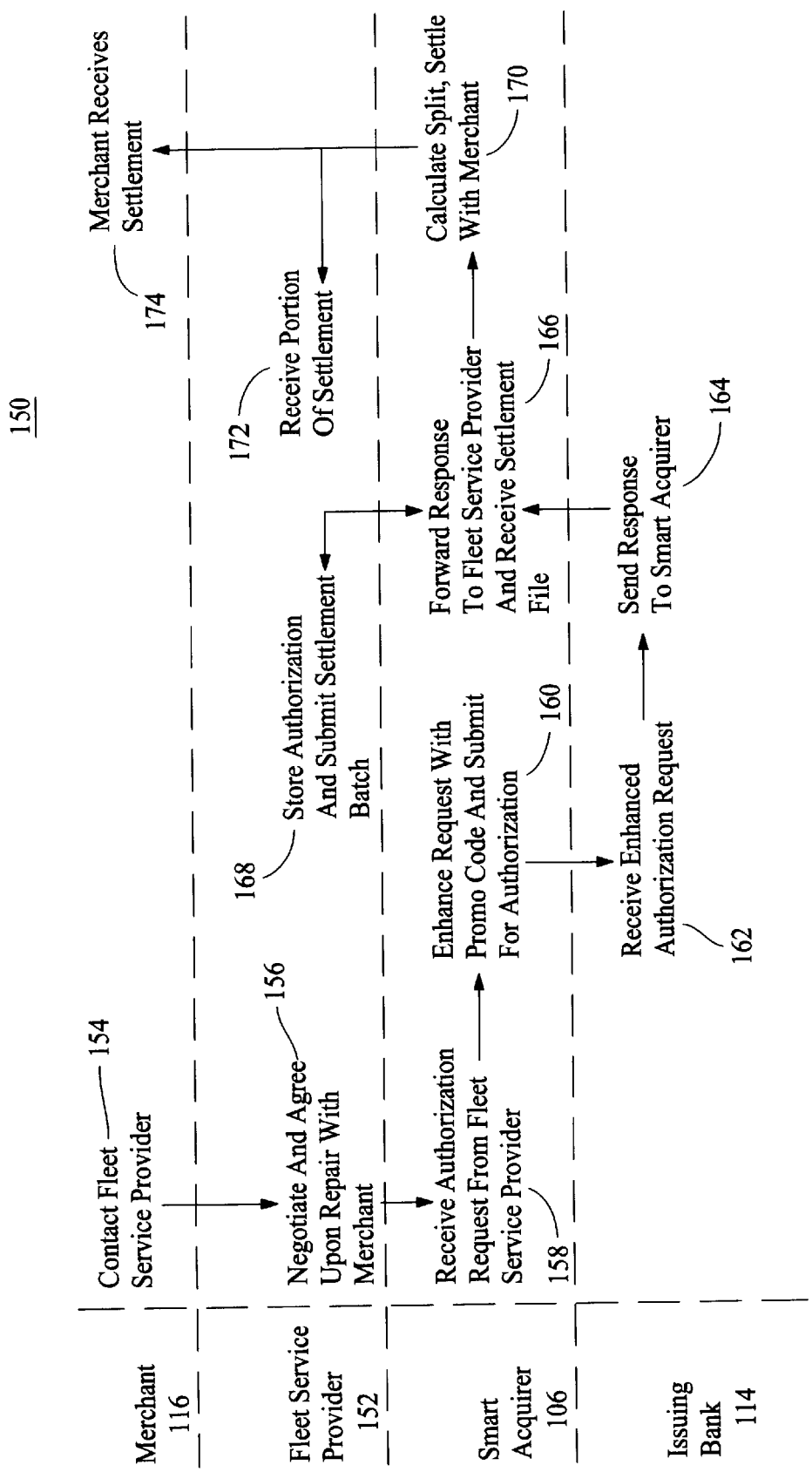
FIG. 2 is a flow diagram illustrating general transaction flow.

FIG. 2 is a flow diagram illustrating an exemplary transaction flow 150. The diagram includes designations for merchant 116, a fleet service provider 152 (hosting or coupled to fleet service provider pre-authorization system 130 in FIG. 1), pre-authorization system (referred to as a smart acquirer in FIG. 2) 106, and issuing bank system 114. As explained above, credit cards are issued to individuals designated by a fleet manager from a specific issuing bank (e.g., issuing bank 114) selected by the fleet manager. The fleet manager typically contracts with fleet service provider 152 who maintains a network of repair providers (i.e., merchants 116). Each fleet manager sets repair authorization parameters for fleet service provider 152 to follow. If a repair exceeds authorization parameters, the fleet manager typically is contacted for approval.

In the exemplary transaction flow shown in FIG. 2, merchant 116 initiates operations by contacting fleet service provider 152 and requesting a repair order authorization 154. Fleet service provider 152 then agrees with merchant 116 on a repair 156 and contacts smart acquirer 106 who receives the authorization request from the fleet service provider 158. Smart acquirer 106 supplies an authorization request to acquiring bank 104. Acquiring bank 104 enhances the request with a promotional code and submits the enhanced request 160 to issuing bank system 114, via credit card system 112. Issuing bank 114 receives the enhanced request 162 and responds 164 to acquiring bank 104 via smart acquirer 106. Acquiring bank 104 then forwards 166 the response to fleet service provider 152. Fleet service provider 152 stores the authorization and after the work is performed by merchant 116, submits 168 a settlement batch to smart acquirer 106. Upon receipt of the settlement batch, smart acquirer 106 determines or calculates the split of payments 170 to be made to fleet service provider 152 and merchant 116, and transmits 172 and 174 the appropriate payments, e.g., via ACH or wire, to fleet service provider 152 and merchant 116.

Figure 3:
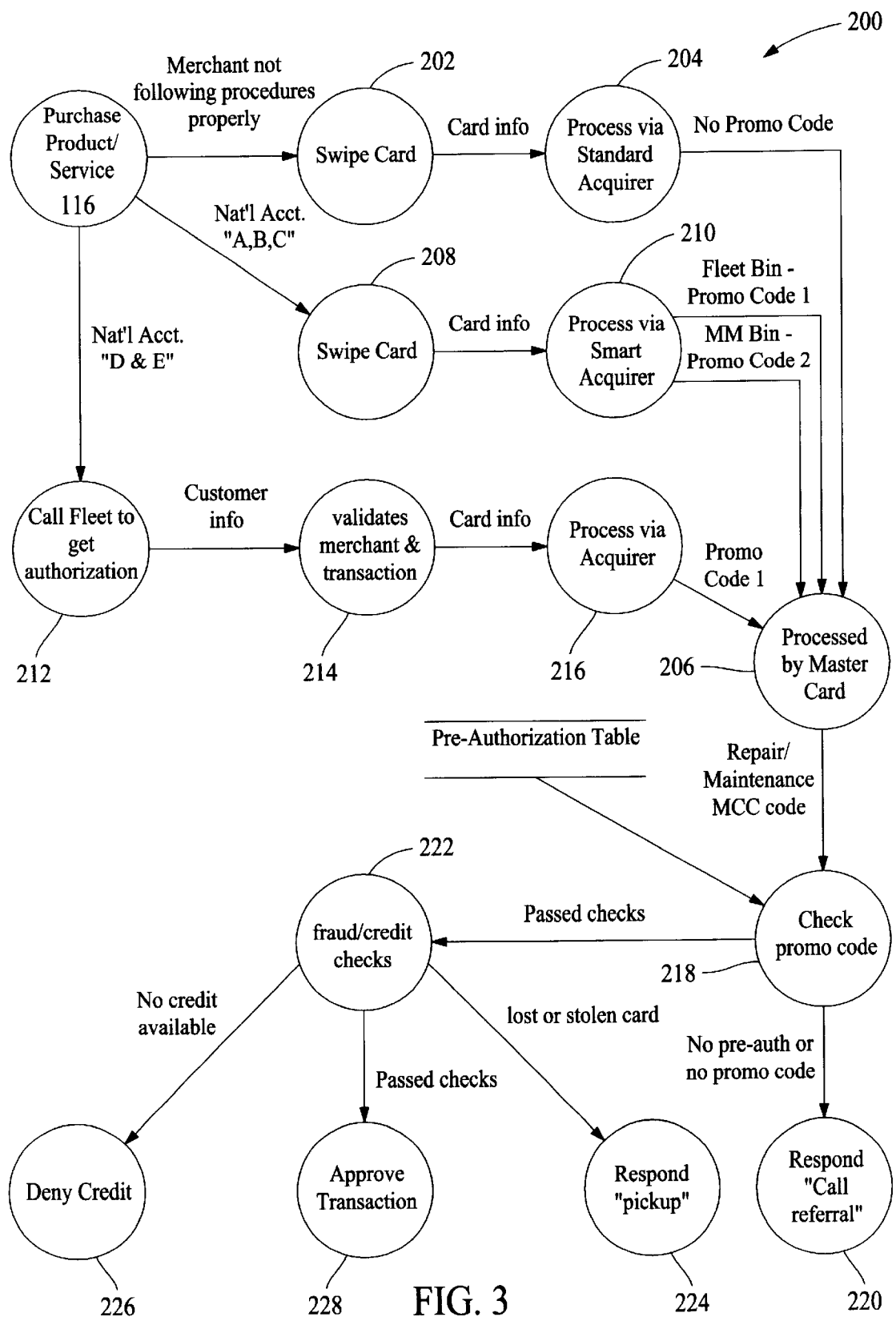
FIG. 3 is a flow chart illustrating a sequence of steps, at a high level, executed in connection with, and by, the authorization and settlement system shown in FIG. 1.

FIG. 3 is a flow chart 200 illustrating a sequence of steps, at a high level, executed in connection with, and by, authorization and settlement system 100 shown in FIG. 1. In explaining the processing steps shown in FIG. 3, reference is made to the components described and illustrated in FIG. 1. In addition, merchants (i.e., service providers) are generally classified as account types "A, B, C, D, and E" in flow chart 200. The steps executed depend, at least in part, on the particular account type. Set forth below is an explanation of the account type letter designations.

| Account Type | Explanation |
| --- | --- |
| A | national account company owned store electronically coupled to acquiring bank system 104 |
| B | national account independent owned store electronically coupled to acquiring bank system 104 |
| C | national account independent owned store electronically coupled to a separate acquiring bank system |
| D | national account independent owned store electronically coupled to a separate acquiring bank |
| E | independent garage electronically coupled to a separate acquiring bank |

Specifically with reference to FIG. 3, processing is initiated by service provider, or merchant, 116 at the point of purchase of the product or service. If the merchant is not following system procedures and simply swipes the card 202, e.g., if the merchant is a type D merchant and swipes the card before obtaining pre-authorization from fleet service provider 152, the card information is transmitted to issuing bank system 114 and processed 204 by issuing bank system (sometimes referred to as the "standard acquirer") 114. No "promo" code will be associated with the transaction in issuing bank pre-authorization system 106. The card information is passed to credit card system 112 by issuing bank system 114. In FIG. 3, credit card system 112 is designated as being a Master Card system, however, other credit card systems could be utilized and the present invention is not limited to practice with any particular credit card system. In any event, the transaction is then processed 206 by credit card system 112.

If the merchant is a type A, B, or C merchant, then when the merchant swipes the card 208, issuing bank system 114 receives the card information. Since the merchant is a type A, B, or C merchant, the transaction will be assigned, in pre-authorization system 106, a "promo" code and is processed 210 by, or at least in connection with pre-authorization system 106 (sometimes referred to as the "smart acquirer"). The transaction can be assigned a "promo" code of 1 or 2 as described hereinafter in more detail in connection with the logic diagram illustrated in FIG. 3.

Still referring to FIG. 3, if the merchant is a type D or E merchant, prior to performing any repairs, the merchant calls 212 (e.g., via the telephone) IVR system 102 to obtain authorization. Via IVR system 102, customer information is supplied and the merchant and transaction are validated 214. Such validation data is supplied to issuing bank pre-authorization system 106, and acquiring bank system 104 processes 216 the transaction and supplies transaction data to credit card system 112. A "promo code" of "1" is assigned to the transaction for processing by acquiring bank system 104, as described below in more detail with references to FIG. 3.

Credit card system 112 obtains, from issuing bank pre-authorization system 106, a repair/maintenance merchant class code (MCC) assigned to the particular transaction. Credit card system 112 also checks 218 the "promo" code assigned to the transaction and stored in pre-authorization system 106. If no pre-authorization or "promo" code is assigned to a particular transaction, then the merchant is provided with a "call referral", or other message, indication at the point of purchase (e.g., on the machine display of the machine at which the credit card is swiped) 220. If a pre-authorization for the transaction is found in the pre-authorization table, and if a "promo" code is assigned to the transaction, then a link is established with the issuing bank system to check for possible fraud or a stolen card 222. If the card has been reported lost or stolen, then "pickup" is displayed to the merchant to indicate that a problem has been identified and the transaction is not to take place 224. If no credit is available, then credit is denied 226. If all the issuing bank checks are passed, then the transaction is approved 228.

More specifically, upon completion of an authorized repair, acquiring bank system 104 credits merchant 116 the authorized amount of the repair. In addition, acquiring bank system 104 credits fleet service provider 152 the amount of any negotiated volume rebate.

The above described system 100 and process 200 enable the fleet manager to control the maintenance and repair authorization process to ensure that the maintenance or repair is necessary and is being provided on a negotiated price basis. In addition, system 100 and process 200 provide an automated authorization and settlement process for the repair and maintenance of fleet vehicles which are simple to use and are believed to reduce the costs associated with fleet management.

Figure 4:
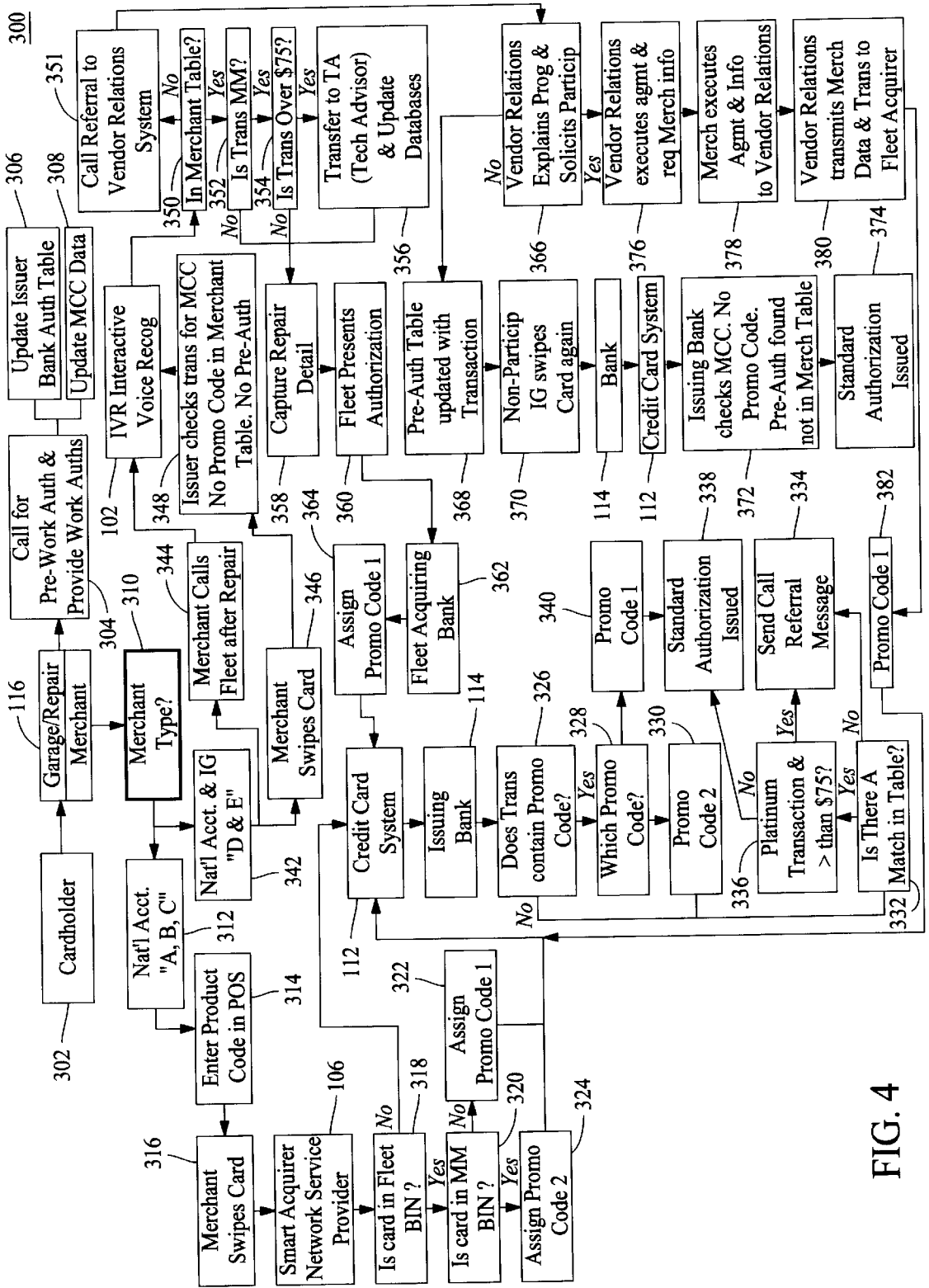
FIG. 4 is a logic diagram setting forth, in more detail than shown in FIG. 3, the logic steps executed in connection with, and by, the authorization and settlement system shown in FIG. 1.

FIG. 4 is a logic diagram 300 setting forth, in more detail than shown in FIG. 3, logic steps executed in connection with, and by, authorization and settlement system 100. In explaining the steps shown in FIG. 3, reference is made to the components described and illustrated in FIG. 1. In addition, it should be understood that FIG. 4 describes, in more detail, certain steps referenced in FIGS. 2 and 3.

Specifically referring to FIG. 4, a cardholder 302 proceeds to merchant site 116 (e.g., garage or repair shop). If merchant 116 is not within the network, the cardholder instructs that merchant to call the fleet service provider (e.g., vendor relations system) for pre-authorization for performance of the work 304. The fleet manager then updates 306 the authorization table associated with the issuing bank in pre-authorization system 106 and also updates 308 the MCC data in MCC system 110. In this manner, a non-network provider can be authorized to perform services in connection with a fleet vehicle while providing the fleet manager an opportunity to review the necessity of the work as well as to negotiate the price to be paid for the work. In addition, such contacts provide the fleet manager an opportunity to discuss with the provider the benefits of being included within the network as an authorized provider.

If the merchant is a network provider 310 and is a type A, B, or C merchant 312, then the merchant enters the product code into the point of sale terminal 314 and swipes the credit card 316. Issuing bank system 114 receives the card information, and the transaction is processed via smart acquirer network service provider 106. Smart acquirer 106 determines whether the swiped card is in the fleet bin 318. If the card is not in the fleet bin, then credit card system 112 proceeds with processing. If the card is in the fleet bin, then smart acquirer 106 checks whether the card is in the maintenance management (MM) bin 320. If the card is not in the MM bin, a "promo" code of "1" is assigned to the transaction 322. If the card is in the MM bin, a "promo" code of "2" is assigned to the transaction 324. Subsequent to assigning a "promo" code to the transaction, communications are established with credit card system 112.

Credit card system 112 communicates with issuing bank system 114, and if the transaction has been assigned a "promo" code 326, then the code is checked in the pre-authorization table 328. If the transaction does not have a "promo" code, or if a "promo" code of "2" is assigned to the transaction 330, then processing proceeds to determine whether there is a match 332 in the pre-authorization table of system 106. If no match is found, then a call referral message, or other message, is displayed at the merchant site 334. If there is a match, and if 336 the transaction is a "platinum" type transaction greater than $75, then a call referral message is displayed at the merchant site 334. If the transaction is not a platinum transaction or is less than or equal to $75, then the transaction is authorized 338. Similarly, if a "promo" code of "1" is assigned to the transaction 340, the transaction is authorized 338.

If the merchant is a type D or E merchant 342, and if the merchant calls 344 (e.g., via the telephone) the fleet service provider after performing the repair, the fleet directs the call to IVR system 102 to obtain authorization. If the merchant swipes 346 the card prior to calling the fleet manager, then issuing bank system 114 checks whether an MCC has been assigned to the transaction, whether the merchant is an authorized merchant, and whether a "promo" code has been assigned 348. Since an MCC and a "promo" code will not be assigned to the transaction, the merchant will be instructed to contact IVR system 102.

Once in IVR system 102, the merchant will identify itself and system 102 checks whether the merchant is an authorized merchant in the merchant table 350 stored in system 102. If the merchant is not in the merchant table, then the call is referred 351 to vendor relations system 108. If the merchant is in the table, then the system checks whether the transaction is maintenance management (MM) 352. If the service is MM, and if 354 the transaction is over $75, then the call is transferred 356 to a technical advisor for assistance (e.g., so that the databases can be updated). If the transaction is MM, and if the transaction is not over $75, then the repair detail is captured 358 by IVR system 102, e.g., through a series of prompts and responses. After obtaining the repair detail, the authorization processing is initiated 360 by contacting 362 acquiring bank system 104 and assigning a "promo" code of "1" to the transaction 364. Processing then continues by linking to credit card system 112, which in turn links to system 114 and executing steps 326–340 as described above.

With respect to calls referred 351 to vendor relations system 108, after vendor relations explains the program and solicits participation 366, if the merchant does not agree to participate in the program, then the pre-authorization table in system 106 is updated 368 to contain information related to the transaction. The merchant then swipes the card again 370, and communications are established directly with issuing bank system 114. Issuing bank system 114 establishes a link with credit card system 112, and issuing bank 114 checks for an MCC 372 stored in system 106. Since the merchant declined participation, no "promo" code and no pre-authorization will be made. A standard authorization may then be issued 374 by issuing bank system 114.

If the merchant agrees to participate, then an agreement is provided to the merchant and vendor relations obtains information related to the merchant 376. After the merchant executes the agreement 378, the merchant data and the transaction are forwarded to the fleet acquirer 380 and a "promo" code of "1" is assigned to the transaction 382. Processing then proceeds as described above in connection with establishing communication with credit card system 112, which in turn links to system 114, and executing steps 326–340.

By using the above described process, a fleet may control the maintenance and repair authorization process to ensure that the maintenance or repair is necessary and is being provided on a negotiated price basis. In addition, such process enables substantial automation of the authorization and settlement process for the repair and maintenance of fleet vehicles, and such automation is believed to lead to cost savings with respect to fleet management.

Figure 5:
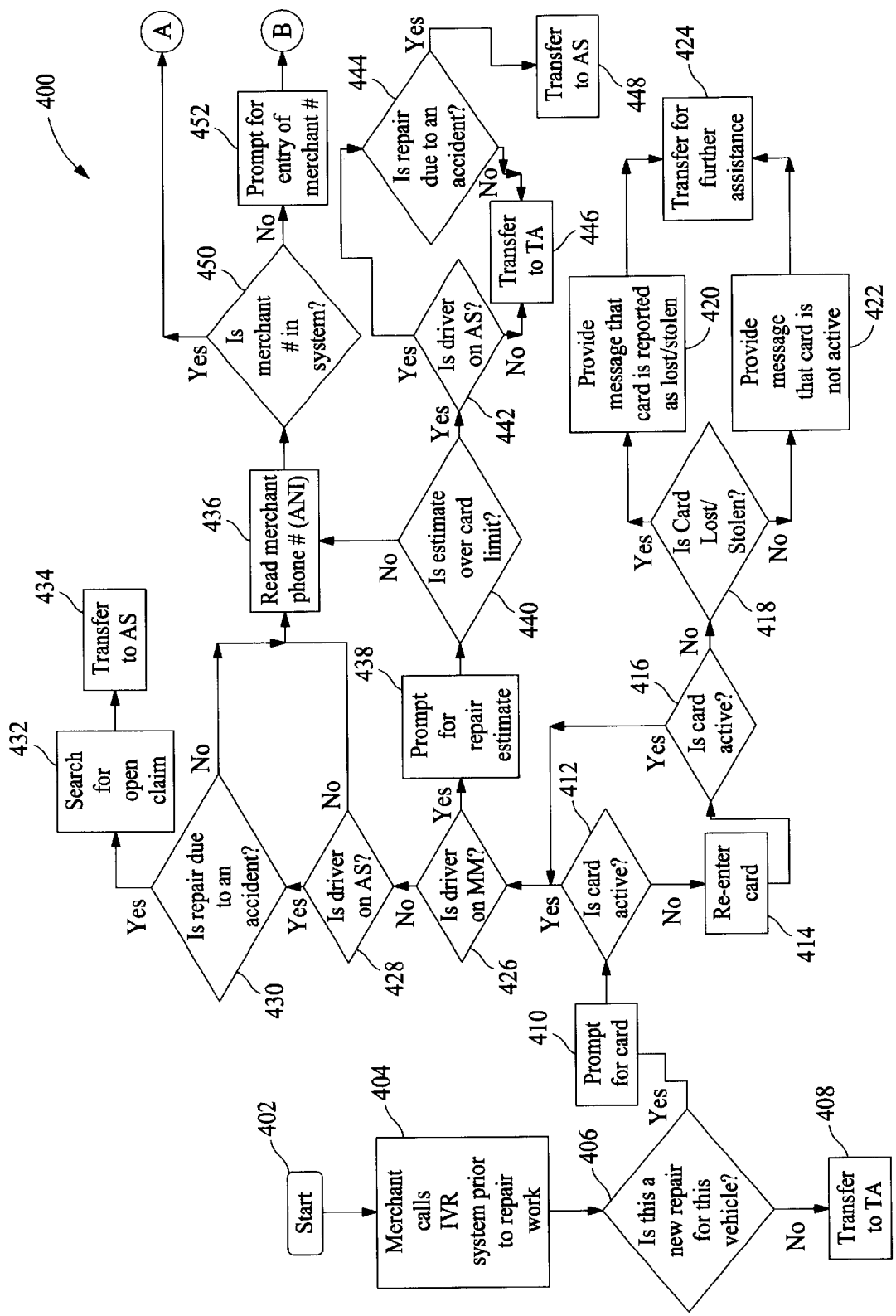
FIGS. 5, 6, and 7 are flow diagrams setting forth the process steps associated with, and executed by, the interactive voice recognition system shown in FIG. 1.
Figure 6:
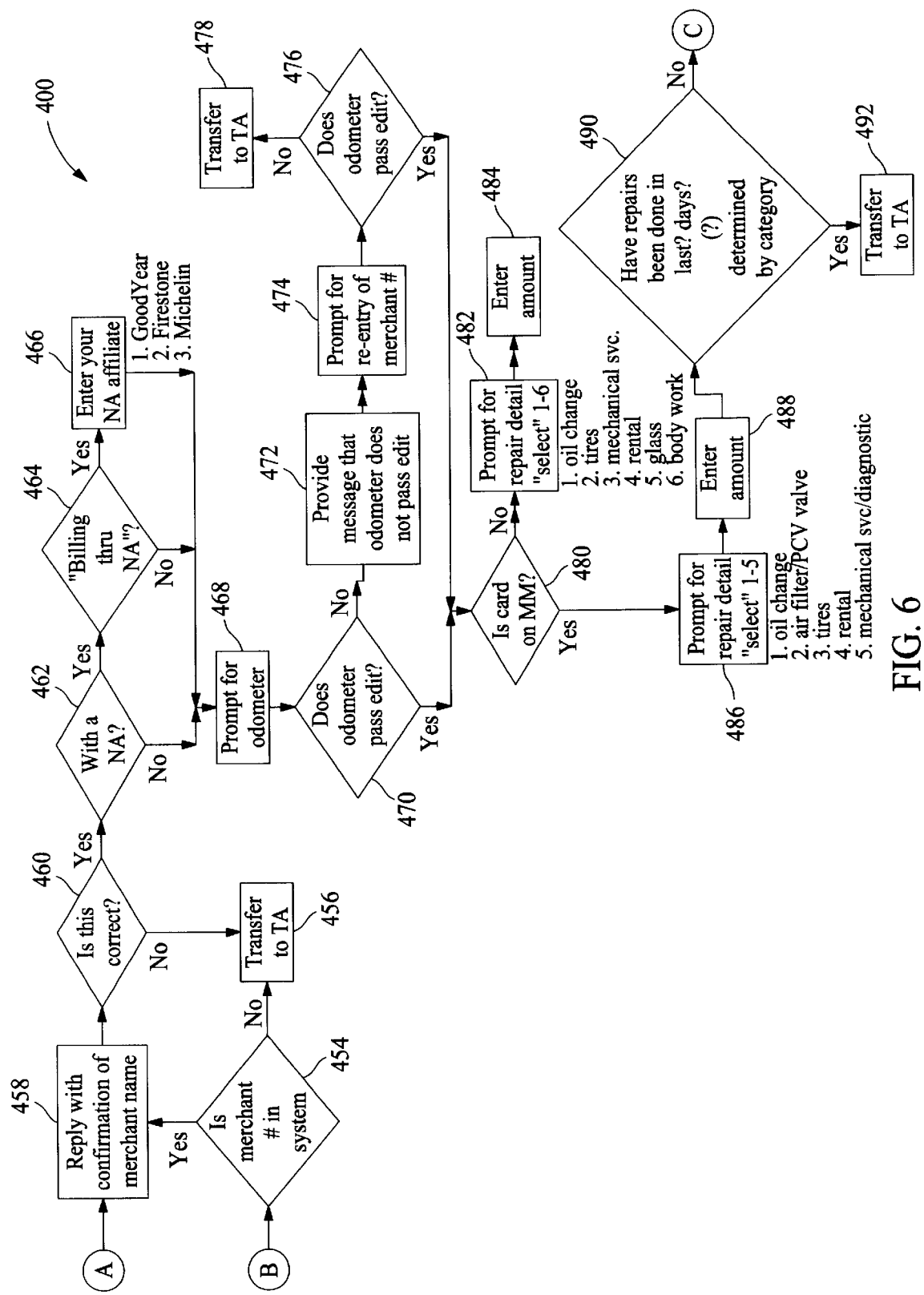
Figure 7:
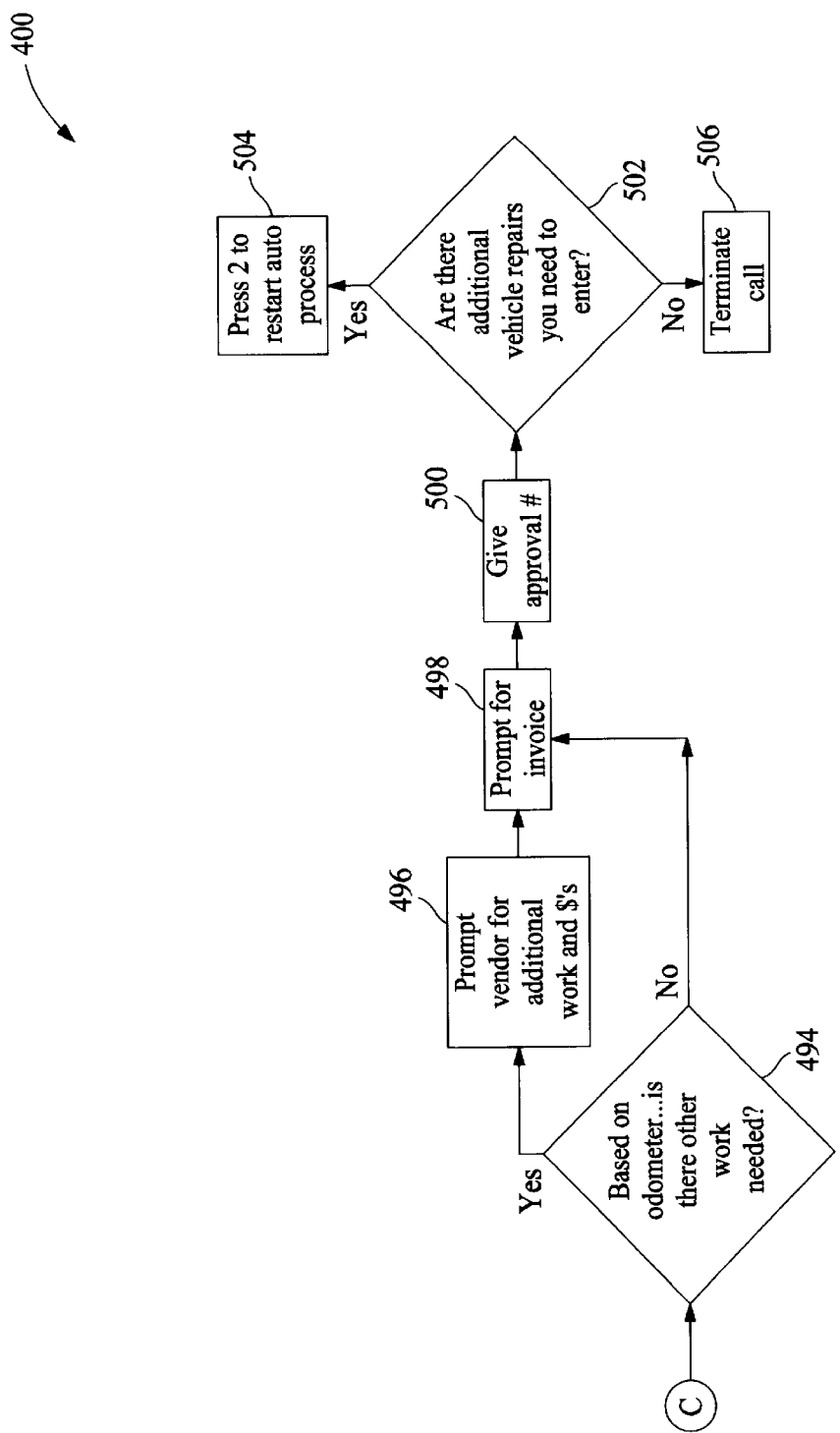

FIGS. 5, 6, and 7 illustrate a flow diagram 400 setting forth the process steps executed by interactive voice recognition system 102 referenced above. As shown in FIG. 5, once operations start 402, the merchant calls 404 IVR system 102 prior to performing the repair work. If the repair is not a new repair for the vehicle 406, then communication is transferred to a technical advisor 408.

If the repair is a new repair 406, then the merchant is prompted to enter credit card data via the telephone keypad 410. IVR system 102 then determines whether the card is active 412. If the card is not active, then the merchant is prompted to re-enter the card data 414 on the telephone keypad. After obtaining the re-entered data, system 102 makes a second determination as to whether the card is active 416, and if the card is not active, the system checks whether the card is lost or stolen 418.

If the card is lost or stolen, then system 102 informs the merchant that the card is reported as being lost or stolen 420. If the card is not lost or stolen, then system 102 informs the merchant that the card is not active 422. In both instances, the merchant is transferred to vendor relations 108 for further assistance 424.

If the card is active, system 102 checks whether the driver is in the maintenance management (MM) program 426. If the driver is not in the MM program, and if the driver is in the accident services program 428, system 102 determines (e.g., by prompting the provider for inputs) whether the repair is due to an accident 430. If the repair is due to an accident, then system 102 searches the database of pre-authorization system 106 for an open claim 432 and transfers the call to accident services (AS) 434. If the repair is not due to an accident, then system 102 reads the merchant's telephone number (ANI) 436. Similarly, if the driver is not in the AS program, the system also reads the merchant's telephone number 436. If the driver is in the MM program, then system 102 prompts the merchant for a repair estimate 438. System 102 then checks whether the estimate is over the card limit 440, and if the estimate is not over the card limit, then system 102 reads the merchant's telephone number 436.

If the estimate is over the card limit, then system 102 checks whether the driver is in the AS program 442. If the driver is in AS, system 102 checks whether the repair is due to an accident 444. If the driver is not on the AS program, or if the repair is not due to an accident, then the merchant is transferred to a technical advisor 446. If the repair is due to an accident, then the merchant is transferred to AS 448.

If processing proceeds to checking 450 whether the merchant's telephone number is in MCC system 110, and if the merchant number is in system 110, then processing proceeds to the steps shown in FIG. 6 via connector A. If the number is not in the system, then system 102 prompts the operator for entry of the merchant number 452 and processing proceeds to the steps shown in FIG. 6 via connector B.

Referring now to FIG. 6, and with respect to proceeding with processing from connector B, system 102 then re-checks whether the merchant number is in the system 454, and if it is not, then the merchant is transferred to a technical advisor 456. If the merchant number is in the system, as determined at checks 450 (FIG. 5) or 454, then processing proceeds with confirming the merchant name 458. System 102 then prompts the merchant to reply whether the merchant name is correct 460. If the merchant name is not correct, then the merchant is transferred to a technical advisor 456. If the merchant name is correct, then system 102 checks whether the merchant is with a national account 462. If the merchant is with a national account, then system 102 checks whether billing is to be through the national account 464, and if it is, the merchant is prompted to enter the national account affiliate (e.g., Good Year, Firestone, Michelin) 466. If the merchant is not a national account, or if billing is not through the national account, or after entering the national account affiliate, then system 102 prompts the merchant to enter the odometer reading 468.

The odometer reading is checked (edited) to determine when the last maintenance work/repair was performed and whether milage is reasonable since such work 470. If milage is not reasonable since the most recent work, then system 102 provides a message that the odometer does not pass edit 472. System 102 also prompts the merchant to enter the merchant number 474 and the odometer edit check is performed again 474. If the odometer still does not pass the edit 476, then the merchant is transferred to a technical advisor 478.

If the odometer does pass the edit, then the credit card is checked to determine whether it is included in the MM service 480. If the card is not included in the MM services, then the merchant is prompted for a repair detail selection 482. That is, system 102 provides a message indicating which keypad numeral designation to press for a specific type of repair (e.g., 1. oil change; 2. tires; 3. mechanical service; 4. rental; 5. glass; 6. body work). Once the repair detail has been entered, then system 102 prompts the merchant to enter the dollar amount to be charged for the repair 484.

Similarly, if the card is on the MM service, then the merchant is prompted for a repair detail selection 486. That is, system 102 provides a message indicating which keypad numeral designation to press for a specific type of repair (e.g., 1. oil change; 2. air filter/PCV valve; 3. tires; 4. rental; 5. mechanical svc/diagnostic; 6. body work). Once the repair detail has been entered, then system 102 prompts the merchant to enter the dollar amount to be charged for the repair 488. System 102 also checks whether repairs have been done within a preselected time period depending upon the category of work to be performed 480 (e.g., for an oil change (selection 1), system 102 may check whether an oil change has been performed within the previous 60 days). If the repair has been performed within the predefined time period, then the merchant is transferred to a technical advisor 492. If the repair has not been performed within the predefined time period, then the processing continues to the steps shown in FIG. 4c via connector C.

Referring now to FIG. 7, and proceeding with processing from connector C, system 102 checks whether other repair work is required based on the odometer reading 494. If additional work is needed, then system 102 prompts the merchant (vendor) to provide additional work and the billing for such work 496. If no further work is required based on the odometer reading, or after prompting for the additional work and billing for such additional work, the merchant is prompted to input an invoice amount 498. System 102 then provides the merchant with an approval number 500 and prompts the merchant to indicate whether additional vehicles are to be repaired 502. If no additional vehicles are to be repaired, then the call is terminated 504. If additional vehicles are to be repaired, processing then the returns 506 to the start 402 (FIG. 5). When the call with IVR system 102 is terminated, processing proceeds to step 350 as shown in FIG. 4.

IVR system 102 can be used in connection with system 100 as described above. In addition, it is contemplated that IVR system could be used in connection with other system architectures for authorization and settlement of fleet maintenance and repair transactions.

The above described systems and methods provide the advantages of reducing fleet management costs while automating and simplifying the authorization and settlement process associated with the repair and maintenance of fleet vehicles. In addition, such systems and methods enable the fleet to control the maintenance and repair authorization process to ensure that the maintenance or repair is necessary and is being provided on a negotiated price basis.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An authorization system for authorizing transactions relating to vehicle maintenance or repair on vehicles of a fleet, a fleet service provider having a network of merchants for performing the vehicle maintenance and repair work, said system comprising:

a smart acquirer comprising a processor and a database, said database comprising a pre-authorization table, said smart acquirer processor configured to assign a code from said pre-authorization table to an authorization request received from at least one of the fleet service provider and the merchant, said smart acquirer processor further configured to determine an amount to be paid to the fleet service provider and the merchant for work performed by the merchant upon receipt of a settlement file;

an acquiring bank system comprising a processor for processing an authorization request and code from said smart acquirer to determine whether to authorize work identified in the request, and if the work is authorized, transmitting a settlement file to the smart acquirer.

2. A system in accordance with claim 1 further comprising a vendor relations system coupled to said smart acquirer, said vendor relations system comprising an interactive voice recognition system.

3. A system in accordance with claim 1 further comprising a credit card system coupled to said acquiring bank system, said credit card system comprising a processor configured for determining whether a valid charge can be made against a credit card account.

4. A system in accordance with claim 3 further comprising an issuing bank system coupled to said credit card system and configured so that if said acquiring bank system determines that a charge is valid and authorized, said issuing bank system issues or declines an authorization through said credit card system.

5. A system for authorizing work to be performed on a vehicle within a fleet of vehicles by network and non-network service providers and to be paid for by a driver using a credit card, a fleet service provider maintains the network of service providers and negotiates with non-network service providers, said system configured to:

determine whether a merchant is a network provider;

determine whether the credit card is an authorized fleet credit card;

assign a code to a proposed transaction;

issue an authorization based at least in part upon whether the merchant is a network provider, whether the credit card is an authorized fleet credit card, and the assigned code;

receive a settlement amount for work performed on the vehicle by the merchant; and determine a percentage of the settlement amount to be paid to the fleet service provider and the merchant.

6. A system in accordance with claim 5 wherein to determine whether a merchant is a network provider, said system is configured to determine whether a merchant is identified in a merchant table stored in a database.

7. A system in accordance with claim 5 wherein to determine whether a credit card is an authorized fleet credit card said system is configured to determine whether a credit card is identified in a database.

8. A system in accordance with claim 5 wherein codes assigned to proposed transactions include designations for at least repair work and maintenance work.

9. A method for authorizing transactions related to repair and maintenance work for fleet vehicles, the transactions involving the use of credit cards, and a plurality of merchants having been designated as network service providers and being classified within predetermined classifications, the network of service providers is maintained by a fleet service provider, said method comprising the steps of:

determining whether the credit card is a fleet issued card;

determining whether the credit card is authorized for use in payment for maintenance services;

determining whether the merchant is an authorized merchant;

determining whether the work is maintenance work;

receiving a settlement amount for work performed on a vehicle by the merchant; and determining a percentage of the settlement amount to be paid to the fleet service provider and the merchant.

10. A fleet maintenance and repair authorization system for authorizing maintenance and repair work on vehicles, said system comprising:

an interactive voice recognition system for handling authorizations and repair data capture for network providers;

an issuing bank pre-authorization system for storing information relating to pre-authorized repair and maintenance services and coupled to said interactive voice recognition system;

an acquiring bank system for assigning codes to the various requests that may be generated and coupled to said interactive voice recognition system;

a vendor relations system coupled to said issuing bank pre-authorization system, said vendor relations system includes at least one of a data and a voice link to said interactive voice recognition system so that in the event that a particular merchant is not an authorized service provider, a direct link can be established between the merchant and the vendor relations system to facilitate merchant set-up as an authorized provider;

a merchant identification system coupled to said issuing bank pre-authorization system; and a fleet services provider pre-authorization system, said fleet services provider pre-authorization system linked electronically to a credit card system, so that if the credit card system determines that a charge is valid and authorized based on pre-defined criteria, said acquiring bank system issues the authorization to a service provider.

11. A system in accordance with claim 10 wherein said acquiring bank system coupled to said fleet service providers pre-authorization system, said acquiring bank system configured to assign codes to transactions received from said fleet service providers pre-authorization system.

12. A system in accordance with claim 10 wherein said merchant identification system matched to pre-authorization table codes for transactions.

13. A system in accordance with claim 10 wherein said credit card system coupled to said issuing bank pre-authorization system configured for determining whether a valid charge can be made against a credit card account.

14. A system in accordance with claim 10 wherein said issuing bank pre-authorization system coupled to said credit card system and configured so that if said issuing bank pre-authorization system determines that a charge is valid and authorized, said issuing bank pre-authorization system issues or declines an authorization through said credit card system.

15. A system in accordance with claim 10 further comprising a service provider and a fleet service provider, wherein said issuing bank pre-authorization system determines a service provider payment and a fleet service provider payment.

16. A system in accordance with claim 15 wherein said issuing bank pre-authorization system transmits said service provider payment to said service provider and transmits a fleet service provider payment to said fleet service provider.

17. A system in accordance with claim 10 wherein to determine whether a merchant is a network provider, said system is configured to determine whether a merchant is identified in a merchant table stored in a database.

18. A system in accordance with claim 10 wherein to determine whether a credit card is an authorized fleet credit card, said system is configured to determine whether a credit card is identified in the centralized database.

19. A system in accordance with claim 10 wherein codes assigned to proposed transactions include designations for at least repair work and maintenance work.

20. A method for managing maintenance and repair transactions for a fleet of vehicles using a network-based authorization system including a server system coupled to a centralized interactive database and at least one client system, said method comprising the steps of:

providing a fleet service provider to maintain a network of merchants for performing maintenance and repair work on the vehicles;

determining the classification of a merchant based on pre-determined criteria and determining whether the merchant is an authorized merchant;

directing the merchant to an interactive voice recognition system;

determining whether the work to be performed is an authorized work;

issuing an authorization for the work to be performed;

receiving a settlement amount for work performed on a vehicle by the merchant; and determining a percentage of the settlement amount to be paid to the fleet service provider and the merchant.

21. A method in accordance with claim 20 wherein the authorization system further includes an interactive voice recognition system coupled to a pre-authorization system, and wherein if the merchant is not an authorized network merchant, the merchant is directed by the interactive voice recognition system to a vendor relations group to enable collection of information.

22. A method in accordance with claim 20 wherein said method further comprises the step of assigning a code to the transaction, the code indicating whether the transaction relates to repair and maintenance work.

* * * * *